United States Patent [19]

Coulmance et al.

[11] 4,085,310

[45] Apr. 18, 1978

[54] CONTROL DEVICE FOR ELECTRIC HEATING SYSTEMS OF THE BI-JUNCTION TYPE FOR AN APARTMENT BUILDING

[75] Inventors: Jean-Pierre Réné Coulmance, Osny; Jean-Claude Gérard Six, Sevres, both of France

[73] Assignee: U.S. Philips Corporation, New York, N.Y.

[21] Appl. No.: 670,364

[22] Filed: Mar. 25, 1976

[30] Foreign Application Priority Data

Mar. 26, 1975   France .................................. 75 09447

[51] Int. Cl.² .............................................. H05B 1/02
[52] U.S. Cl. ...................................... 219/502; 165/11; 236/94
[58] Field of Search ............... 219/486, 487, 480, 490, 219/494, 501, 502, 506; 236/94; 165/11

[56] References Cited

U.S. PATENT DOCUMENTS

| | | | |
|---|---|---|---|
| 3,453,450 | 7/1969 | Evalds | 219/502 X |
| 3,969,611 | 7/1976 | Fonteneau | 219/502 |
| 3,995,686 | 12/1976 | Laube | 165/11 |

*Primary Examiner*—J. V. Truhe
*Assistant Examiner*—Fred E. Bell
*Attorney, Agent, or Firm*—Frank R. Trifari; Bernard Franzblau

[57] ABSTRACT

Control of a heating system by means of modulating electronic thermostats. Two thermostats are coupled by an opto-electronic device in order to meet the requirements with respect to the "bi-junction" heating system. A double power-limiting device moreover allows the ratio of the maxiumum power dissipated by the two resistors with which the heating convector is equipped to be varied.

5 Claims, 3 Drawing Figures

CONTROL DEVICE FOR ELECTRIC HEATING SYSTEMS OF THE BI-JUNCTION TYPE FOR AN APARTMENT BUILDING

The invention relates to a control device for electric heating systems of the "bi-junction" type for an apartment building in which each apartment is equipped with convectors which comprise two heating resistors which are energized from an individual circuit and a collective circuit respectively.

Such a heating system, which is described in a document entitled "chauffage electrique direct bi-jonction" (direct electric by-junction heating) published by "Electricite de France" in August 1974 is destined for use in buildings in which the thermal insulation of the outer walls is particularly satisfactory, but in which the partition walls between the apartments cannot be equipped with such an insulation for technical or economic reasons.

Thus, thermal exchanges between parts of adjacent apartments are liable to occur when these parts are at different temperatures. It is then evident that these exchanges will be at the expense of the occupant of the best heated room.

"Bi-junction" heating has been designed in order to obtain the most equitable apportionment of the heating charges for each occupant in accordance with the desired degree of heating comfort.

A "bi-junction" heating system comprises a first, collective, power supply circuit, which ensures a minimum basic temperature (generally 15° C) in all the apartments of the building, said temperature being maintained with the aid of a thermostat whose control point cannot be adjusted by the user.

A second, individual, heating circuit can be switched on by the occupant of an apartment who requires a higher temperature in his apartment, the corresponding amount of power being recorded by an individual meter.

In order to prevent any possibility of fraud, the collective circuit of each apartment is installed separately and its wiring is accommodated in a tamper-proof enclosure.

If the collective heating is switched on when individual heating is needed, the amount of power consumed by the individual heating is proportional to the difference between the temperature required by the user and the basic temperature, provided that the ratio of the power in the individual and in the collective circuits is suitably selected.

In known systems a bulb thermostat which is thermally coupled with the heating resistor of the individual heating circuit ensures that the resistor of the collective circuit is switched in via a switch which is connected in series with the last-mentioned resistor.

The drawbacks of an on/off control system for electric heating are well-known; inaccurate adjustment of the temperature owing to a large control difference, the production of noise owing to abrupt variations of the temperature of parts of the heating convector, etc. In the specific case of "bi-junction" heating the presence of a bulb thermostat which couples the two resistors results in an additional delay which adds to the inaccuracy of the control system.

As stated hereinbefore, the ratio of the power in the collective and in the individual circuit should be adapted to each specific case in accordance with the exposure or location of the apartment in the building. This necessitates the use of several types of convectors with different power ratios, or of appliances equipped with switchable resistors in order to enable them to be adapted to their operating environment. It is evident that this requirement leads to a substantial increase in the system cost.

One of the objects of the invention is to adapt the control provided by a modulating electronic thermostat to "bi-junction" heating.

Another object of the invention is to enable the ratio of the power in the heating resistors of the individual and the collective circuits respectively to be varied as required with the electronic control device.

In accordance with the invention, the control device for electric heating systems of the "bi-junction" type for an apartment building of which each apartment is equipped with convectors which comprise two heating resistors which are energized from an individual circuit and a collective circuit respectively, is characterized in that it comprises a first and a second modulating electronic thermostat which are respectively connected to two electronic switches which are included in series with each of the heating resistors which are energized by the individual circuit and by the collective circuit respectively, the output of the first thermostat being coupled to the input of the second thermostat by an opto-electronic device.

Advantageously, an adjustable bistable trigger circuit for power limiting is connected to each of the ramp generators of the modulating thermostats.

The use of modulating electronic thermostats ensures that an ambient temperature is maintained substantially without differential variations around the control point, while the provision of opto-electronic coupling, to the exclusion of any d.c. coupling, ensures the required isolation between the individual and the collective heating circuit.

Moreover, the absence of electromechanical switching assures a perfectly silent operation of the heating convectors as well as an increased reliability.

Finally, the presence of a bistable trigger circuit which is connected to the ramp generator of each modulating thermostat enables the maximum power dissipated by each resistor to be limited separately, and thus to alter said power ratio so as to adapt it to each specific case. This last mentioned possibility enables the use of a single type of convector with a unity power ratio, which is less expensive to be manufactured and stocked.

The modulating electronic thermostats from which the device in accordance with the invention is derived are of the monolithic integrated circuit type, for example those which are commercially availabe from N. V. Philips Gloeilampenfabrieken under the designation "TCA 280A."

The power limiting device having a bistable trigger circuit bears a certain resemblance to another device which is the subject of the Applicant's U.S. patent application Ser. No. 670,363 filed simultaneously with the present application.

The following description with reference to the accompanying drawings will enable the invention to be more fully understood.

Figure 1:
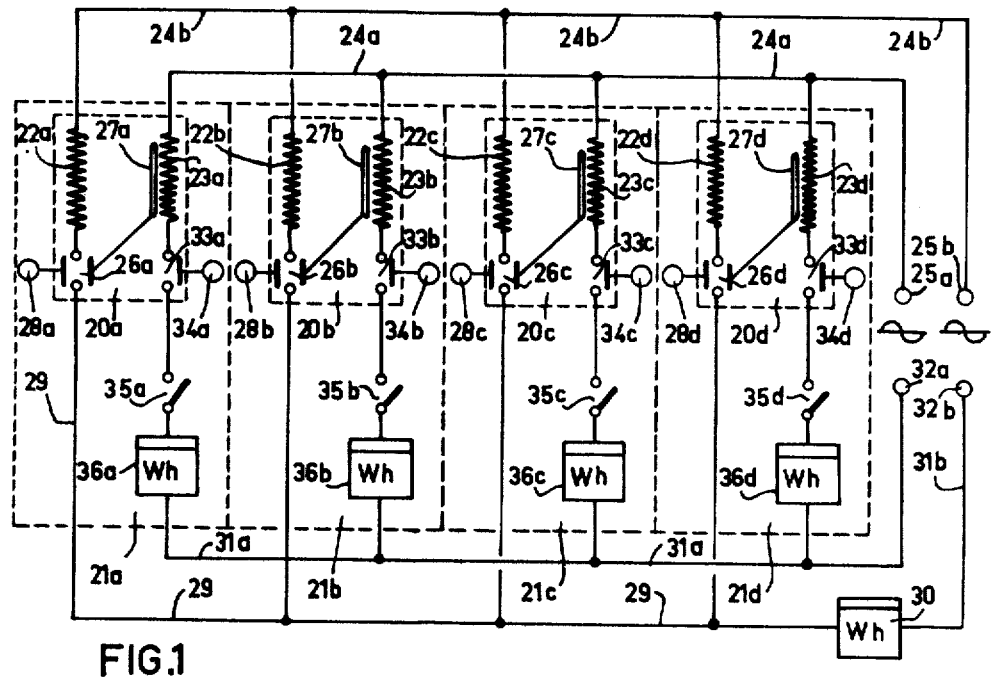
FIG. 1 shows the circuit diagram of a "bi-junction" heating system for a building comprising four apartments, which number of apartments, given by way of example, is not limitative for this heating system.

In FIG. 1, the heating convectors 20a, 20b, 20c, 20d of the apartments 21a, 21b, 21c and 21d are provided with four pairs of resistors 22a–23a, 22b–23b, 22c–23c, 22d–23d.

One of the ends of the resistors 22a, 22b, 22c and 22d and one of the ends of the resistors 23a, 23b, 23c and 23d are respectively connected to a common conductor 24b of the collective circuit and to a common conductor 24a of the individual circuit. The conductors 24a and 24b are connected to two terminals 25a and 25b.

The other ends of the resistors 22a and 22b, 22c and 22d are connected to respective contacts of the four single-pole switches 26a, 26b, 26c and 26d which are simultaneously actuated by four bulb-type thermostats 27a, 27b, 27c and 27d thermally coupled with the resistors 23a, 23b, 23c and 23d, and by four preset basic temperature thermostats 28a, 28b, 28c and 28d.

The other contacts of the switches 26a to 26d are connected to a common conductor 29 which, via a collective electric power meter 30, is connected to terminal 32b via a conductor 31b.

The other ends of the reistors 23a to 23d are connected to one of the contacts of the four other single-pole switches 33a, 33b, 33c and 33d which are respectively actuated by four adjustable ambient-temperature thermostats 34a, 34b, 34c and 34d.

The other contacts of the switches 33a to 33d are respectively connected to a terminal 32a via four manually actuated switches 35a, 35b, 35c and 35d, four individual electric power meters 36a, 36b, 36c and 36d and a common conductor 31a.

The heating system which is schematically represented in FIG. 1 operates in the following manner, for example, for the apartment 21a.

The supply voltage of the individual circuit is applied across the terminals 25a and 32a, while the supply voltage of the collective circuit is applied across the terminals 25b and 32b.

In a specific case of a single phase AC, power supply, the terminals 25a – 25b as well as the terminals 32a – 32b may be combined and for example constitute the phase and neutral terminals. The basic-temperature thermostat 28a, whose control point cannot be adjusted by the user, closes the switch 26a for the resistor 22a of the collective circuit when the room temperature is for example, below 15° C.

In order to obtain a higher temperature the user sets the control point of the ambient-temperature thermostat 34a to, for example, 20° C and closes the switch 35a. The resistor 23a of the individual circuit is then switched in, thus closing the switch 26a for the resistor 22a of the collective circuit via the coupling thermostat 27a, and keeps it closed above 15° C when the contacts of the basic-temperature thermostat 28a are open.

When the room temperature has increased to 20° C, switch 33a opens and disconnects the resistor 23a from the individual circuit, which also causes the collective circuit to be interrupted by means of the coupling thermostat 27a. Subsequently, control is effected normally around the control point by switching the two heating resistors of the individual and the collective circuit into and out of circuit in succession.

For a normally occupied apartment building it is in fact found that the presence of the basic-temperature thermostats 28a to 28d is not necessary in most cases. If, for example, the apartment 21b is not occupied while the apartments 21a and 21c are occupied, the thermal losses via the partition walls and, a fortiori via the floors and ceilings of a building having several stories, keep the temperature of the apartment 21b at a value which is slightly higher than the basic temperature.

However, said thermostats are indispensible in the case that the building is to be used as a second home, for example in a winter sports resort. In these situations their control point is fixed in such a way as to obtain a satisfactory compromise between a reasonably low basic power consumption and a sufficiently short warm-up time.

Figure 2:
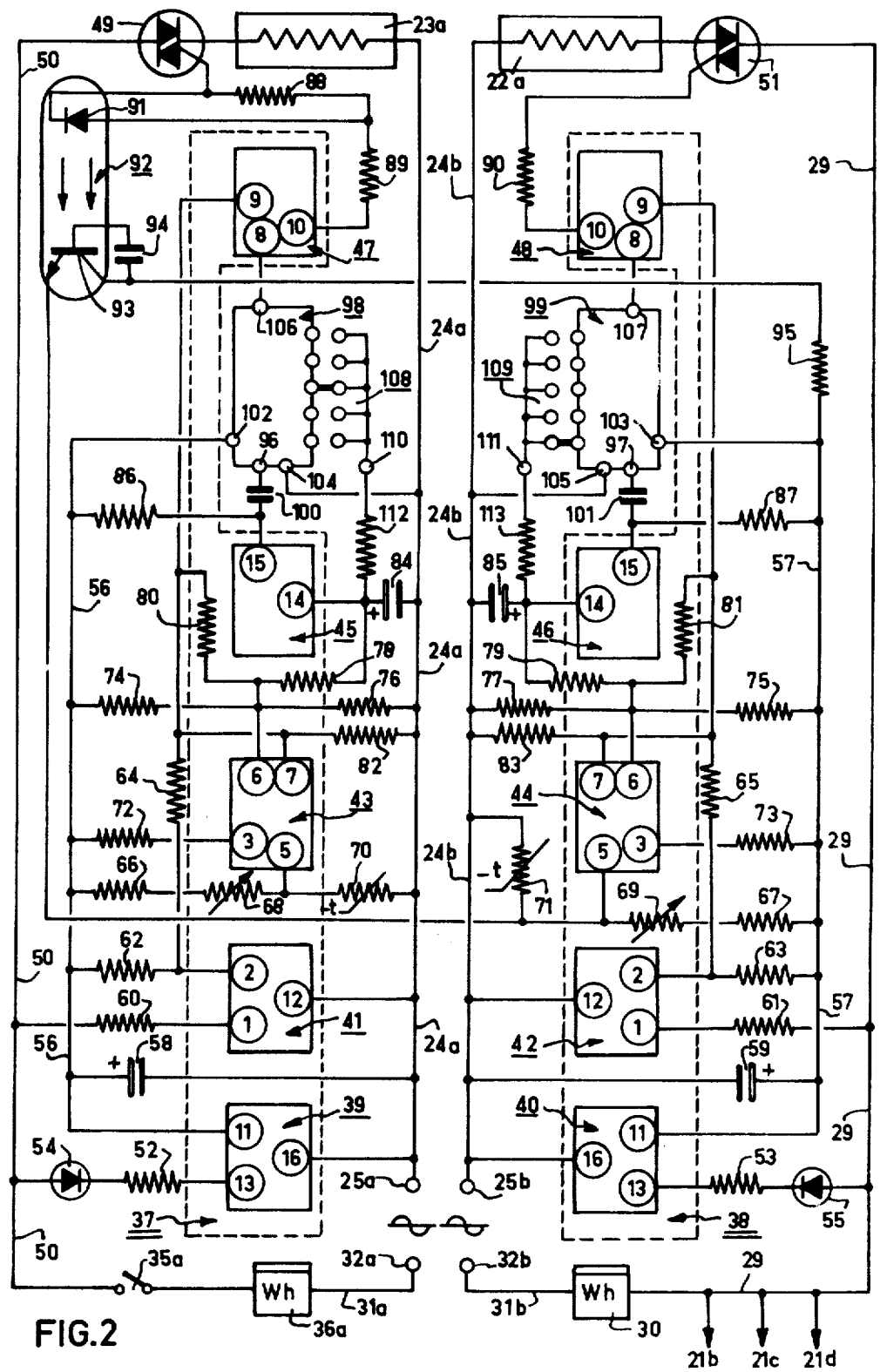
FIG. 2 shows a diagram, partly in block-schematic form, of the control device in accordance with the invention used in one of the apartments of FIG. 1.

In FIG. 2, in which the reference numerals are the same as those in FIG. 1, two integrated monolithic circuits 37 and 38 of the TCA 280A type are shown in dashed boxes and comprise two voltage stabilizers 39–40, two zero passage detectors 41–42, two differential amplifiers 43–44, two ramp generators 45–46, and two output amplifiers 47–48. The numbered input or output terminals of the integrated circuits 37 and 38 are represented by a circle in each of the blocks which correspond to the previously mentioned functions.

Via a triac 49 the heating resistor 23a of the individual circuit is connected to a conductor 50 which is connected to the switch 35a. Similarly via the triac 51, the heating resistor 22a of the collective circuit is connected to the conductor 29 which also energizes the collective heating circuit of the apartments 21b, 21c and 21d.

Via two resistors 52 and 53 the inputs 13 of the voltage stabilizers 39 and 40 are connected to the cathodes of two rectifying diodes 54 and 55 whose anodes are respectively connected to the conductors 50 and 29.

The positive stabilized-voltage outputs 11 of the circuits 39 and 40 are respectively connected to two conductors 56 and 57, the negative outputs 16 being connected to the conductors 24a and 24b. Two filtering capacitors 58 and 59 are included between the positive conductors 56 and 57 and the common conductors 24a and 24b respectively.

The inputs 1 of the zero passage detectors 41 and 42 are respectively connected to the conductors 50 and 29 via two resistors 60 and 61, while the inputs 12 are connected to the common conductors 24a and 24b respectively. The outputs 2 are furthermore connected both to the positive conductors 56 and 57 via two resistors 62 and 63 and to the inputs 9 of the output amplifiers 47 and 48 via two resistors 64 and 65.

Between the positive conductors 56–57 and the common conductors 24a and 24b two resistor chains are included each comprising two fixed resistors 66 and 67, two variable resistors 68 and 69, and two resistors with a negative temperature coefficient (NTC) 70 and 71.

The power supply input 3 of the differential amplifiers 43 and 44 are connected to the conductors 56 and 57 via two resistors 72 and 73, while the first signal inputs 5 are connected to common points of the variable resistors 68–69, and the resistors 70–71. The second signal inputs 6 are connected to the conductors 56 and 57, to the conductors 24a and 24b, to the inputs 14 of the ramp generators 45 and 46, and to the inputs 9 of the amplifiers 47 and 48 via eight resistors 74–75, 76–77, 78–79 and 80–81 respectively.

The outputs 7 of the differential amplifiers 43 and 44 are connected both to the conductors 24a and 24b via two resistors 82 and 83, and directly to the inputs 9 of the output amplifiers 47 and 48.

Two electrolytic capacitors 84 and 85 are connected between the conductors 24a and 24b and the inputs 14 of the ramp generators 45 and 46, while the outputs 15 are connected to the positive conductors 56 and 57 via two resistors 86 and 87 respectively.

Via two series-connected resistors 88 and 89 the control electrode of the triac 49 is connected to the output 10 of the amplifier 47, while the control electrode of the triac 51 is connected to the output 10 of the amplifier 48 by a resistor 90.

The cathode of the light-emitting diode 91 of a photocoupler 92 is connected to the control electrode of the triac 49, the anode being connected to the common junction point of the resistors 88 and 89.

The base of the photo-transistor 93 of the photo-coupler 92 is coupled to the collector by a capacitor 94, said collector being connected to the positive conductor 57 via a resistor 95, while the emitter is connected to the input 5 of the differential amplifier 44.

The input terminals 96 and 97 of two bistable trigger circuits 98 and 99 are coupled to the outputs 15 of the ramp generators 45 and 46 via two capacitors 100 and 101. The positive supply terminals 102 and 103 of said trigger circuits are connected to the conductors 56 and 57 respectively, while the negative terminals 104 and 105 are connected to the common conductors 24a and 24b. Furthermore, the output terminals 106 and 107 of the trigger circuits are connected directly to the supply voltage inputs 8 of the amplifiers 47 and 48.

The common contacts of the two five-way single-pole switches 108 and 109 of the trigger circuits 98 and 99 are connected to two terminals 110 and 111 which are connected to the inputs 14 of the ramp generators 45 and 46 via two resistors 112 and 113.

Figure 3:
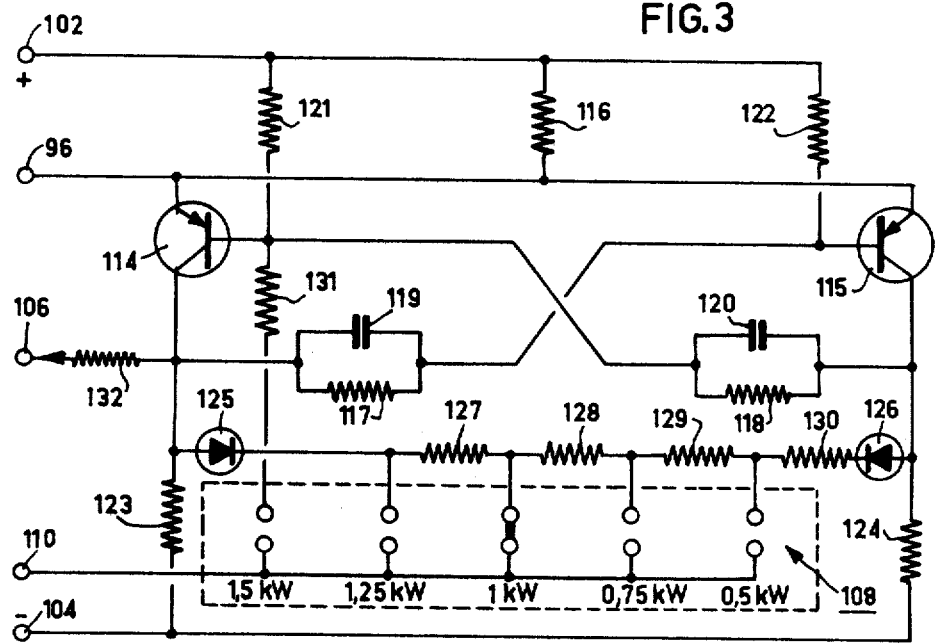
FIG. 3 shows the functional diagram of one of the two power modulators with which the control device in accordance with the invention is equipped.

In FIG. 3, in which the reference numerals correspond to those in FIG. 2, the bistable trigger circuit 98 comprises two transistors 114 and 115 of the PNP type whose interconnected emitters are connected to the positive supply terminal 102 via a resistor 116 and directly to the input terminal 96.

The bases and collectors of the transistors 114 and 115 are cross-coupled by two resistors 117 and 118 which are respectively shunted by two capacitors 119 and 120.

The bases of the transistors 114 and 115 are further connected to the terminal 102 by two resistors 121 and 122 respectively, while the collectors are connected to the negative terminal 104 via two resistors 123 and 124.

The anodes of two blocking diodes 125 and 126 are respectively connected to the collectors of the two transistors 114 and 115, while the chain of four resistors 127, 128, 129 and 130 is included between the cathodes of said diodes.

The common contacts of the five-way single-pole switch 108 are connected to the terminal 110, the five other contacts being connected, in this order, to the base of the transistor 114 via a resistor 131, to the common junction point between the diode 125 and the resistor 127, to the common junction point between the resistors 127 and 128, to the common junction point between the resistors 128 and 129, and to the common junction point between the resistors 129 and 130.

The collector of the transistor 114 is connected to the output terminal 106 via a resistor 132.

The operation of each of the modulating thermostats with which the device is equipped, for example 37, is well-known. A sawtooth (or ramp) signal which is applied to the input 6 of the differential amplifier 43 is compared with a variable direct voltage which is applied to the input 5 of the same applier. Depending on whether the direct voltage applied to input 5 is higher or lower than the instantaneous sawtooth voltage applied to input 6, the triac 49 is either conducting or cut off.

The value of the direct voltage at input 5 is a function of the value of the NTC resistor 70 which serves as the ambient-temperature sensor, the desired control temperature being adjusted by means of the variable resistor 68.

As the temperature of the sensor 70 approximates the control point more closely, the on-off ratio of the triac 49 decreases, complete cut-off being obtained when said temperature is reached.

The period of the sawtooth is chosen slightly smaller than that of the thermal time constant of the assembly to be controlled in order to make the temperature fluctuations negligible.

In order to avoid RF interference the detector circuit 41 ensures that the triac 26 is turned on/off during the zero passage of the sinusoidal supply voltage.

The operation of the device in accordance with the invention is based on what will be set forth hereinafter, the general control principle being maintained for each of the two individual and collective circuits.

If the switch 35a is open, and if the room temperature is higher than the basic temperature measured by the NTC sensor 71 (for example 16° at 15° C), the complete device is inactive and the resistors 22a and 23a are not energized. If the switch 35a is closed, the light-emitting diode 91 of the photo-coupler 92 is energized each time that the control electrode of the triac 49 receives a control pulse. Upon each of these pulses the photo-transistor 93 is bottomed, discharging the capacitor 94, as a result of which the voltage at the input terminal 5 of the differential amplifier 44 increases. The collective heating resistor 22a is then energized.

When the diode 91 is no longer energized, photo-transistor 93 remains conductive throughout the time that the capacitor 94 is re-charged. Such a delay allows the appearance of a subsequent pulse which indicates a permanent operation of the individual heating to be detected. If this is not the case, the photo-transistor 93 is turned off once the capacitor 94 has been re-charged and collective heating is discontinued.

The integration of the control signals prevents the average power dissipated in the collective heating resistor 22a from being modulated in the beat rhythm of the repetition frequencies of the two ramp generators 45 and 46. In any case, the discharge time of the capacitor 94 should be greater than the maximum time interval between two control pulses during permanent operation, which time interval is of the order of 30 seconds.

The presence of the photo-coupler 92 ensures absolute d.c. isolation between the two thermostats, which for example allows the individual circuit to be energized by connecting the terminals 25a and 32a between the neutral and the phase conductor of a three-phase AC supply, and the terminals 25b and 32b of the collective circuit between the phase conductors of the same AC supply.

If the switch 35a is open, the collective heating (resistor 22a) can be switched on only if the room temperature drops below the basic temperature measured by the NTC sensor 71, which temperature is for example 15° C.

It follows from all this that by means of the control device in accordance with the invention all requirements relating to the "bi-junction" heating system designated "DB4" in the previously cited document by Electricite de France can be complied with.

An additional advantage results from the presence of the two power-limiting trigger circuits 98 and 99 which operate as follows (FIG. 3): each of the sawtooth signals received from the ramp generator 45 via the terminal 96 changes the state of the trigger circuit, as a result of which the charging current of capacitor 84 (FIG. 2), which current comes from the terminal 102 and which is available at the terminal 110, follows two different paths depending on the state of said trigger circuit. If the transistor 114 is bottomed and the switch 108 is in the position 1 kW, said charging current passes through the resistor 116, the transistor 114, the diode 125 and resistor 127. In the other state, the charging current passes through the resistor 116, the transistor 115, the diode 126 and the resistors 130, 129, 128. As the output terminal 106 is connected to the supply terminal 8 of the amplifier 47, the latter can operate only when the transistor 114 is bottomed. Thus, the on-off ratio of the triac 49 and thus the average power dissipated in the resistor 23a can be varied as a function of the position of the switch 108. In short, the presence of the trigger circuit ensures that one of every two sawtooth periods at the amplifier 47 is suppressed, the slope of the remaining sawtooth waveforms varying as a function of the position of the switch 108.

When the switch 108 is in the position for maximum convector power (1.5kW), capacitor 84 (FIG. 2) is charged via the resistors 121 and 131, operation of the trigger circuit then being prevented by the fixed bias of the base at the transistor 114 which causes it to be permanently saturated.

The amplifier 47 is then energized during each sawtooth, as the case may be, allowing the resistor 23a to be energized with full power.

As the trigger circuit 99 with which the collective heating circuit is equipped operates in exactly the same way, it is obvious that the respective positions of the switches 108 and 109 enable an adequate power ratio of the power of the resistors 22a and 23a to be chosen.

What is claimed is:

1. A control device for electric heating systems of the "bi-junction" type for use in an apartment building in which each apartment is equipped with convectors which comprise first and second heating resistors which are energized from an individual circuit and a collective circuit respectively, said control device comprising a first and a second modulating electronic thermostat respectively connected to first and second electronic switches individually connected in series with the first and second heating resistors respectively, and means coupling the output of the first thermostat to an input of the second thermostat by means of an opto-electronic device.

2. A control device as claimed in claim 1 wherein each of said modulating electronic thermostats includes a ramp generator and further comprising first and second power limiting adjustable bistable trigger circuits respectively connected to the ramp generators of the modulating thermostats.

3. A control device as claimed in claim 1, characterized in that the opto-electronic device comprises a photo-coupler which includes a light-emitting diode and at least one photo-transistor.

4. A control device as claimed in claim 2, characterized in that a bistable trigger circuit comprises two transistors, with two collectors connected to a resistor chain via two diodes.

5. A control device as claimed in claim 4, characterized in that the resistors of the chain are connected to a switch whose common contact is connected to the ramp generator.

* * * * *